United States Patent
Tabuchi

(10) Patent No.: US 11,360,722 B2
(45) Date of Patent: Jun. 14, 2022

(54) PRINTING APPARATUS AND NON-TRANSITORY COMPUTER-READABLE STORAGE MEDIUM

(71) Applicant: BROTHER KOGYO KABUSHIKI KAISHA, Nagoya (JP)

(72) Inventor: Maya Tabuchi, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 17/144,062

(22) Filed: Jan. 7, 2021

(65) Prior Publication Data

US 2021/0208828 A1 Jul. 8, 2021

(30) Foreign Application Priority Data

Jan. 8, 2020 (JP) .............................. JP2020-001722

(51) Int. Cl.
*G06F 3/12* (2006.01)

(52) U.S. Cl.
CPC .......... *G06F 3/1231* (2013.01); *G06F 3/1204* (2013.01); *G06F 3/1205* (2013.01); *G06F 3/1221* (2013.01); *G06F 3/1259* (2013.01); *G06F 3/1286* (2013.01)

(58) Field of Classification Search
CPC .... G06F 3/1231; G06F 3/1204; G06F 3/1205; G06F 3/1221; G06F 3/1259; G06F 3/1286
USPC ........................................... 358/1.15
See application file for complete search history.

(56) References Cited

U.S. PATENT DOCUMENTS

| | | | |
|---|---|---|---|
| 8,441,665 B2 * | 5/2013 | Matsuda | H04N 1/00477 358/1.15 |
| 11,019,176 B2 * | 5/2021 | Ando | H04N 1/00474 |
| 2002/0161830 A1 * | 10/2002 | Mukaiyama | G06F 3/1292 709/203 |
| 2008/0008302 A1 | 1/2008 | Yim | |

(Continued)

FOREIGN PATENT DOCUMENTS

| | | |
|---|---|---|
| JP | 2006-166449 A | 6/2006 |
| JP | 2019-179446 A | 10/2019 |

*Primary Examiner* — Allen H Nguyen
(74) *Attorney, Agent, or Firm* — Kenealy Vaidya LLP

(57) ABSTRACT

A printing apparatus including: a printing unit; and a controller configured to: receive a processing execution instruction for executing a predetermined processing from an external mediation apparatus; determine whether the received processing execution instruction is a first instruction that does not involve a power supply-off operation; and transmit an execution completion report to the external mediation apparatus such that: in a case where the determining determines that the processing execution instruction is the first instruction, the execution completion report is transmitted to the external mediation apparatus at a time when execution of processing instructed by the first instruction is completed; and in a case where the determining does not determine that the processing execution instruction is the first instruction, the execution completion report is transmitted to the external mediation apparatus at a predetermined timing which is before execution of processing instructed by the processing execution instruction is completed.

8 Claims, 7 Drawing Sheets

(56) References Cited

U.S. PATENT DOCUMENTS

2012/0092721 A1\* 4/2012 Jaudon ................. G06F 3/1204
358/1.15
2019/0306115 A1 10/2019 Nishizaki \* cited by examiner

FIG. 2

CORRESPONDENCE DATABASE

| DEVICE ID | GUID | LOCATION INFORMATION | FIRM VERSION | SETTING INFORMATION | | | | UPDATE DATE AND TIME | STATE INFORMATION |
| --- | --- | --- | --- | --- | --- | --- | --- | --- | --- |
| | | | | FONT | FONT SIZE | CONCENTRATION | ... | | |
| 001 | 00A | A BRANCH | 2 | GOTHIC | 14 | 3 | ... | 2018.04.01 | UNDER MANAGEMENT |
| 002 | 00A | A BRANCH | 3 | GOTHIC | 14 | 3 | ... | 2018.04.03 | UNDER MANAGEMENT |
| 003 | 00A | A BRANCH | 2 | GOTHIC | 14 | 3 | ... | 2018.04.02 | UNDER MANAGEMENT |
| 004 | 00B | B BRANCH | 2 | GOTHIC | 12 | 2 | ... | 2018.04.02 | UNDER MANAGEMENT |
| 005 | 00B | B BRANCH | 2 | GOTHIC | 12 | 2 | ... | 2018.04.03 | UNDER MANAGEMENT |
| 006 | 00C | C BRANCH | 2 | MINGCHO | 12 | 2 | ... | 2018.04.02 | UNDER MANAGEMENT |
| 007 | 00C | C BRANCH | 1 | MINGCHO | 14 | 3 | ... | 2018.04.02 | UNDER MANAGEMENT |
| 008 | 00C | C BRANCH | 2 | MINGCHO | 12 | 2 | ... | 2018.04.02 | UNDER MANAGEMENT |
| 009 | 00C | C BRANCH | - | - | - | - | ... | - | UNDER STANDBY |
| ..... | ..... | ..... | ..... | ..... | ..... | ..... | ..... | ..... | ..... |

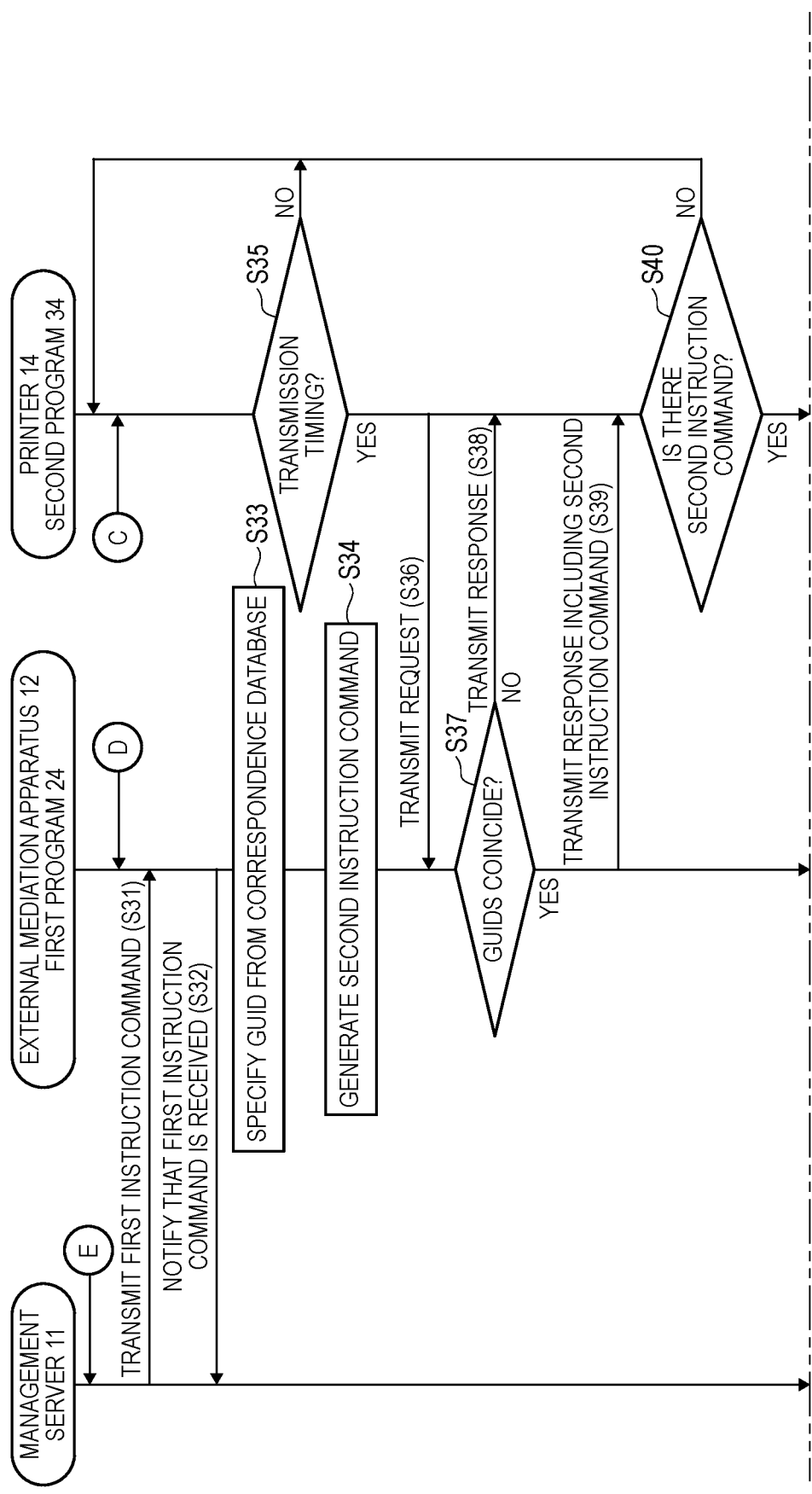

PRINTING APPARATUS AND NON-TRANSITORY COMPUTER-READABLE STORAGE MEDIUM

CROSS-REFERENCE TO RELATED APPLICATIONS

This application is based upon and claims the benefit of priority from prior Japanese patent application No. 2020-001722, filed on Jan. 8, 2020, the entire contents of which are incorporated herein by reference.

TECHNICAL FIELD

An aspect of the present disclosure relates to a printing apparatus configured to perform printing on a printing medium, and anon-transitory computer-readable storage medium storing a computer program that is executed a computer of an electronic device.

BACKGROUND ART

Known is an MDM (Mobile Device Management) system where a management server on the Internet performs communication with a mobile device to manage the mobile device. In related-art technology, an external mediation apparatus (Device Conductor) is communicatively connected to the management server configured to manage printers, via the Internet. An internal mediation apparatus is communicatively connected to the external mediation apparatus, and a printer that is the mobile device is configured to perform communication with the internal mediation apparatus via a local network.

In recent years, instead of the configuration of the related-art technology where the internal mediation apparatus is used for information transfer between the printing apparatus, which is an electronic device, and the external mediation apparatus, proposed is a configuration where the printing apparatus is directly connected to the external mediation apparatus. In this configuration, when managing the printing apparatus by the management server, the printing apparatus is caused to execute desired processing by an instruction from the external mediation apparatus, in response to an administrator's operation on the management server. At this time, in order to notify the management server that the printing apparatus has securely executed the processing, it is necessary to transmit an execution completion report from the printing apparatus to the external mediation apparatus. However, in a case where the processing instructed to the printing apparatus by the external mediation apparatus includes a power supply-off operation of the printing apparatus, after the power supply-off operation is executed, power of the printing apparatus for transmission is lost, so that it is impossible to transmit the execution completion report.

SUMMARY

Aspects of the present disclosure provide a printing apparatus and a non-transitory computer-readable storage medium, which are capable of transmitting an execution completion report to an external mediation apparatus before a power supply-off operation is executed and thus the execution completion report becomes incapable of being transmitted.

According to an aspect of the present disclosure, there is provided a printing apparatus including: a printing unit configured to perform printing on a printing medium; and a controller, wherein the printing apparatus is configured to perform communication with an external mediation apparatus configured to perform communication with a management server via the Internet, and wherein the controller is configured to: receive a processing execution instruction for executing a predetermined processing from the external mediation apparatus; determine whether the received processing execution instruction is a first instruction that does not involve a power supply-off operation; and transmit an execution completion report to the external mediation apparatus such that: in a case where the determining determines that the processing execution instruction is the first instruction, the execution completion report is transmitted to the external mediation apparatus at a time when execution of processing instructed by the first instruction is completed; and in a case where the determining does not determine that the processing execution instruction is the first instruction, the execution completion report is transmitted to the external mediation apparatus at a predetermined timing which is before execution of processing instructed by the processing execution instruction is completed.

The printing apparatus of the present disclosure is used in a so-called MDM (Mobile Device Management) system. That is, the external mediation apparatus (so-called Device Conductor) is communicatively connected to the management server configured to manage the printing apparatus via the Internet, and the external mediation apparatus is communicatively connected to the printing apparatus.

According to another aspect of the present disclosure, there is provided a non-transitory computer-readable storage medium storing a computer program readable by a computer of an electronic device configured to perform communication with an external mediation apparatus configured to perform communication with a management server via the Internet, the computer program, when executed by the computer, causing the electronic device to perform: receiving a processing execution instruction for executing a predetermined processing from the external mediation apparatus; determining whether the received processing execution instruction is a first instruction that does not involve a power supply-off operation; and transmitting an execution completion report to the external mediation apparatus such that: in a case where the determining determines that the processing execution instruction is the first instruction, the execution completion report is transmitted to the external mediation apparatus at a time when execution of processing instructed by the first instruction is completed; and in a case where the determining does not determine that the processing execution instruction is the first instruction, the execution completion report is transmitted to the external mediation apparatus at a predetermined timing which is before execution of processing instructed by the processing execution instruction is completed.

BRIEF DESCRIPTION OF DRAWINGS

FIG. 2 illustrates a correspondence database;

FIGS. 4A and 4B depict processing that is executed in the management server, the external mediation apparatus, and the printer when causing the printer to execute an instruction transmitted from the management server.

DESCRIPTION OF EMBODIMENTS

An embodiment of the present disclosure will be described with reference to the drawings.

System Outline

Figure 1:
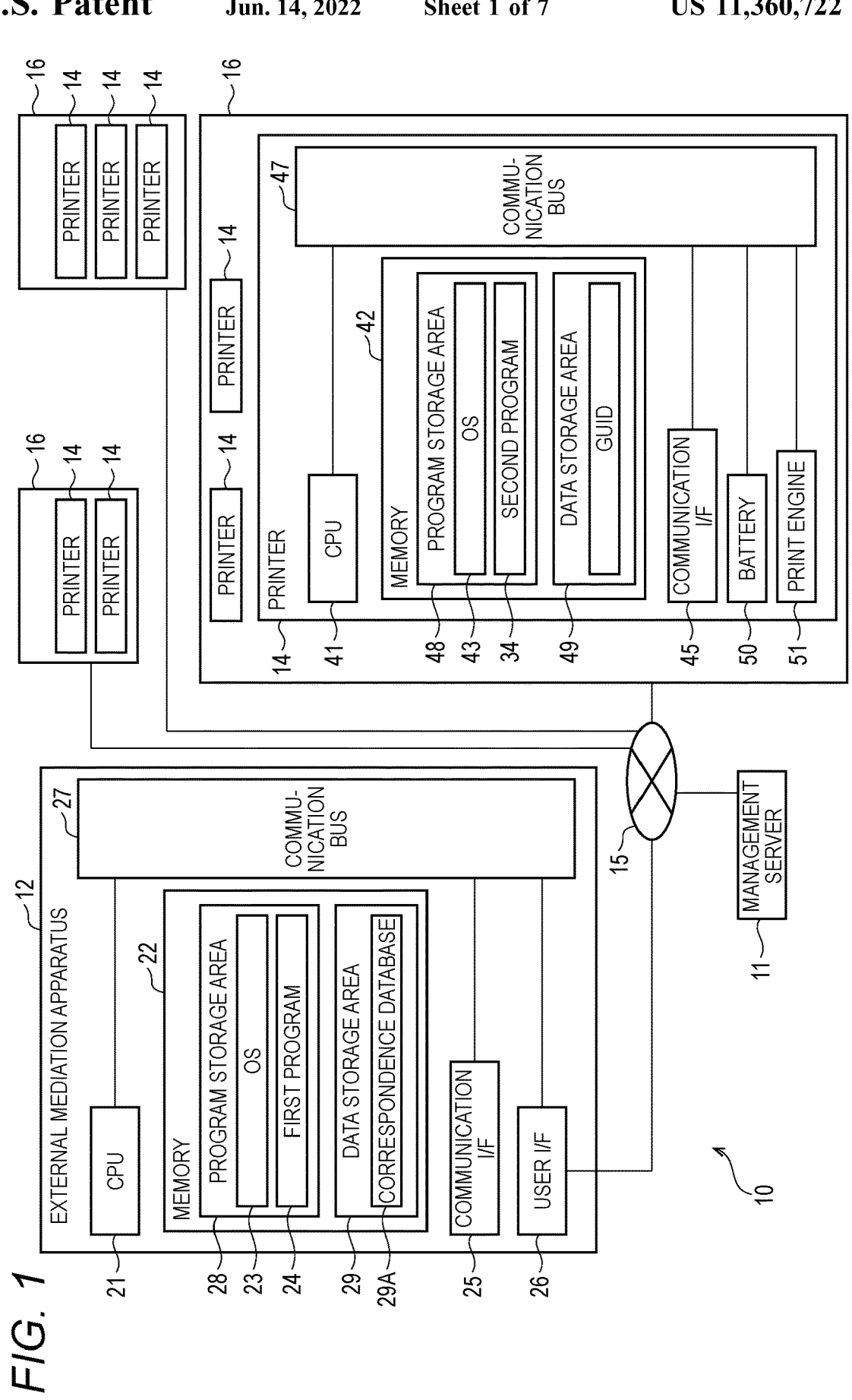
FIG. 1 is a schematic configuration view of a management system in accordance with an embodiment of the present disclosure.

In FIG. 1, a management system 10 of the present embodiment is a system configured to manage a printer 14 by using a so-called mobile device management system. An administrator of the printer 14 browses management information of the printer 14 stored in the management server 11 by using a browser or instructs the printer 14 to change setting information, for example, through the management server 11.

Also, the management system 10 is a system configured to manage a printer 14 having no function of directly performing communication with the management server 11. An external mediation apparatus 12 is used so that the management server 11 can manage the printer 14 having no function of directly performing communication with the management server 11. The printer 14 is an example of the printing apparatus, and is also an example of the electronic device.

The management system 10 includes the management server 11 and the external mediation apparatus 12, which are connected to the Internet 15, and the printer 14 connected to a local network 16.

The management server 11 is a server of a company that provides service to manage mobile devices, for example. The external mediation apparatus 12 is a server of a company that receives the service to manage mobile devices, for example. The local network 16 is established at each branch of the company that receives the service to manage mobile devices, for example. Each branch has one or more printers 14, and the printers 14 at each branch are each connected to the local network 16 at each branch.

In the shown example, the three local networks 16 are established, and the two or three printers 14 are connected to each local network 16. Note that, the number of the local networks 16 in the management system 10 and the number of the printers 4 connected to each local network 16 are not limited to the shown example.

The management server 11 and the external mediation apparatus 12 can perform communication with each other via the Internet 15. Specifically, the management server 11 and the external mediation apparatus 12 each have a global IP address, and perform communication with each other by using Internet protocols using the global IP addresses.

The local network 16 is a so-called intranet, and is, for example, a wired LAN, a wireless LAN, a WAN, or a combination thereof. The printers 14 connected to the local network 16 can perform communication with each other by using a communication protocol such as TCP/IP. Specifically, the printers 14 perform communication with each other by using private IP addresses or MAC addresses.

The local network 16 includes a relay apparatus (not shown) such as a router. The relay apparatus has a global IP address, and is connected to the Internet 15. The printer 14 connected to the local network 16 performs communication with the external mediation apparatus 12 via the relay apparatus. Specifically, the printer 14 and the external mediation apparatus 12 perform communication with each other through a firewall established by the relay apparatus. Note that, the firewall is not necessarily required. That is, in a case where the firewall is not necessary or is less necessary, the relay apparatus may not have the firewall.

The management system 10 is a system that enables management of the printer 14 having no function of directly performing communication with the management server 11 to be implemented in the management server 11 by using the external mediation apparatus 12 configured as described above. Specifically, the management of the printer 14 having no function of directly performing communication with the management server 11 is implemented using a first program 24 that is installed and executed in the external mediation apparatus 12 and a second program 34 that is installed and executed in the printer 14. That is, the management of the printer 14 having no function of directly performing communication with the management server 11 by the management server 11 is implemented by the first program 24 and the second program 34. In the below, the configurations of the external mediation apparatus 12 and the printer 14 are described in detail.

External Mediation Apparatus (Part 1)

The external mediation apparatus 12 includes a CPU 21, a memory 22, a communication interface 25 (hereinbelow, referred to as "communication 25"), a user I/F 26, and a communication bus 27. The CPU 21, the memory 22, the communication I/F 25, and the user I/F 26 are connected to the communication bus 27.

The memory 22 is a ROM, a RAM, an EEPROM, an HDD, a portable storage medium such as a USB memory, or a buffer provided in the CPU 21. The memory 22 may also be a computer-readable storage medium. The computer-readable storage medium is a non-transitory medium. The non-transitory includes also recording media such as a CD-ROM, a DVD-ROM and the like, in addition to the above example. Also, the non-transitory medium is a tangible medium. Note that, an electric signal for carrying a program that is downloaded from a server or the like on the Internet is a computer-readable signal medium that is a kind of the computer-readable medium but is not included in the non-transitory computer-readable storage medium. The same holds true for a memory 42 of the printer 14, which will be described later.

The memory 22 has a program storage area 28 and a data storage area 29. In the program storage area 28, programs such as an OS 23, the first program 24 and the like are stored.

The OS 23 is a basic program of the external mediation apparatus 12. The OS 23 is an operating system such as MacOS (registered trademark), Windows (registered trademark), Linux (registered trademark), Android (registered trademark) OS and the like.

The first program 24 is a program for controlling communication with the management server 11 and the printer 14 via the communication I/F 25 in cooperation with the OS 23. The first program 24 may be a single program or a group of a plurality of programs. The processing that is executed by the first program 24 will be described later.

In the data storage area 29, data necessary for execution of the programs are stored. Also, in the data storage area 29, a correspondence database shown in FIG. 2 is stored.

Correspondence Database

In FIG. 2, a correspondence database has a plurality of items and a plurality of records. In the present example, the plurality of items includes items "device ID", "GUID", "location information", "firm version", "setting information", "update date and time", and "state information". Note that, the correspondence database may also include items other than the above-described items.

The item "device ID" is an ID allotted to the printer 14. The device ID is, for example, a MAC address, an IP address, a serial number or the like of the printer 14. Each record is identified by the device ID. That is, one record is generated for one printer 14.

The item "GUID" indicates a GUID allotted to the second program 34 (which will be described later) provided in the printer 14. Note that, as the GUID, any GUID such as numbers, characters and the like can be used inasmuch as it can identify the second program 34. The same holds true for the device ID.

The item "location information" indicates the local network 16 to which the printer 14 having the second program 34 indicated by the item "GUID" belongs. The item "location information" is, for example, a branch name, a branch office name or the like.

The item "firm version" indicates a version of the second program 34 (which will be described later) installed in the printer 14. Note that, the larger number of the item "firm version" indicates a newer version.

The item "setting information" has a plurality of subdivided items such as an item "font", an item "font size", an item "concentration" and the like. The item "font" means a font of characters that are printed by the printer 14. The item "font size" means a size of characters that are printed by the printer 14. The item "concentration" means a concentration of ink of characters and figures that are printed by the printer 14. The item "setting information" may also have other items such as an item indicating whether an automatic power supply-off function is valid or invalid, an item indicating a printing speed, an item indicating selling parameters of communication, and the like, in addition to the above-described items.

The item "update date and time" indicates date and time when a content indicated by each item in the record is changed.

The item "state information" indicates whether the printer 14 of each record is a management target by the management system 10. "Under management" means that the printer 14 is a management target by the management system 10. "Under standby" means that the printer 14 is not a management target by the management system 10.

External Mediation Apparatus (Part 2)

Returning to FIG. 1, the communication I/F 25 of the external mediation apparatus 12 is an interface capable of performing communication with the management server 11 and the printer 14. The communication I/F 25 is a LAN I/F and a wireless LAN I/F. The external mediation apparatus 12 and the printer 14 perform communication with each other via the communication I/F 25, the Internet 15, the firewall (relay apparatus), the local network 16, and a communication I/F 45.

The user I/F 26 is, for example, a keyboard, a mouse and the like, and is configured to receive an administrator's input.

Printer

The printer 14 includes a CPU 41, a memory 42, a communication I/F 45, a battery 50, a print engine 51, and a communication bus 47. Note that, the print engine is an example of the printing unit, and the CPU 41 is an example of the controller, and is also an example of the computer. The configurations of the CPU 41, the memory 42, the communication I/F 45, and the communication bus 47 are similar to those of the CPU 21, the memory 22, the communication I/F 25, and the communication bus 27 of the external mediation apparatus 12.

The memory 42 has a program storage area 48 and a data storage area 49. In the program storage area 48, programs such as an OS 43, a second program 34 and the like are stored. In the data storage area 49, data necessary for execution of the programs are stored. Also, in the data storage area 49, a device ID and a GUID (Globally Unique Identifier) are stored. The device ID is, for example, a MAC address, a private IP address, a serial number or the like of the printer 14.

The OS 43 is a basic program of the printer 14. The second program 34 is a program for causing the print engine 51 to perform printing on an appropriate printing medium and controlling communication with the external mediation apparatus 12 via the communication I/F 45 in cooperation with the OS 43. The second program 34 may be a single program or a group of a plurality of programs. The processing that is executed by the second program 34 will be described later. Note that, the second program 34 is an example of the computer program.

The communication I/F 45 is an interface capable of performing communication with the external mediation apparatus 12. The communication I/F 45 is configured to receive a command transmitted from the external mediation apparatus 12, and to transmit a response to the command to the external mediation apparatus 12.

The battery 50 is, for example, a secondary battery that can be charged and discharged. In a case where the printer 14 is connected to a commercial power supply, the battery 50 is charged by the commercial power supply, and in a case where the printer 14 is not connected to a commercial power supply, the battery is discharged, thereby supplying drive power to the print engine 51 and the CPU 41.

Processing of Programs

In the below, processing that is executed by the first program 24 and the second program 34 is described.

In the present specification, the processing of the CPU that is executed according to commands described in programs is mainly described. That is, in descriptions below, the processing such as "determination", "extraction", "selection", "calculation", "decision", "specifying", "acquisition", "receiving", "control", "setting" and the like indicates the processing of the CPU. The processing that is executed by the CPU includes hardware control via a controller such as an OS. Note that, "acquisition" is used as a concept that does not necessarily require a request. That is, processing of receiving data without a request of the CPU is also included in the concept that "the CPU acquires data". The processing such as "command", "response", "request" and the like is performed by communicating information indicative of "command", "response", "request" and the like. Also, words such as "command", "response", "request" and the like may be described as meanings of information indicative of "command", "response", "request" and the like.

Also, the processing of the CPU that is executed according to commands described in programs may be described in abbreviated words, such as "the CPU 21 performs", "the program 24 performs", "the external mediation apparatus 12 performs", and the like. The same holds true for the CPU 41. Also, the processing of inputting and outputting information by the program via the communication I/F and the user I/F may be described in abbreviated words, such as "the CPU 21 receives", "the program 24 transmits", "the external mediation apparatus 12 acquires", and the like.

Also, in the present specification, "data" and "information" are common in that they are bits or bit strings that can be treated by a computer. "Data" indicates that semantic content expressed by each bit can be treated without the computer considering the same. In contrast, "information" indicates that operations of the computer are branched by semantic content expressed by each bit. Note that, "data" of different formats are treated as the same data when the semantic content of the data is substantially the same. The same holds true for "information". Also, "instruction" is a control signal for urging a device of a transmission destination to perform a next operation, and may include information or "instruction" itself may have a nature of information.

Also, "data" and "information" are treated as the same data and information inasmuch as the semantic content thereof is recognized as the same, even though a format (for example, a text format, a binary format, a flag format and the like) thereof is changed for each computer. For example, information indicative of "two" may be held as information of a text format such as ASCII code "0x32" in some computers, and may be held as information of a binary format such as a binary number indication "10" in other computers.

However, the "date" and the "information" are not strictly distinguished and may be treated exceptionally. For example, the data may be temporarily treated as the information, and the information may be temporarily treated as the data. Also, the data treated in one device may be treated as the information in another device. Furthermore, the information may be taken out from the data, and the data may be taken out from the information.

Basic Processing Contents of Programs

In the below, processing that is executed by the first program 24 of the external mediation apparatus 12 and the second program 34 of the printer 14 is described with reference to FIGS. 3 to 5B. Although described in detail later, when transmitting and receiving information between the external mediation apparatus 12 and the printer 14, the external mediation apparatus 12 basically transmits information such as an instruction to the printer 14, in a form of being included in an HTTP response to an HTTP request received from the printer 14. For this reason, the printer 14 periodically transmits the HTTP request to the external mediation apparatus 12. Note that, the firewall blocks transmission from the external mediation apparatus 12 to the printer 14, except the HTTP response to the HTTP request transmitted from the printer 14.

Registration of Printer

Figure 3:
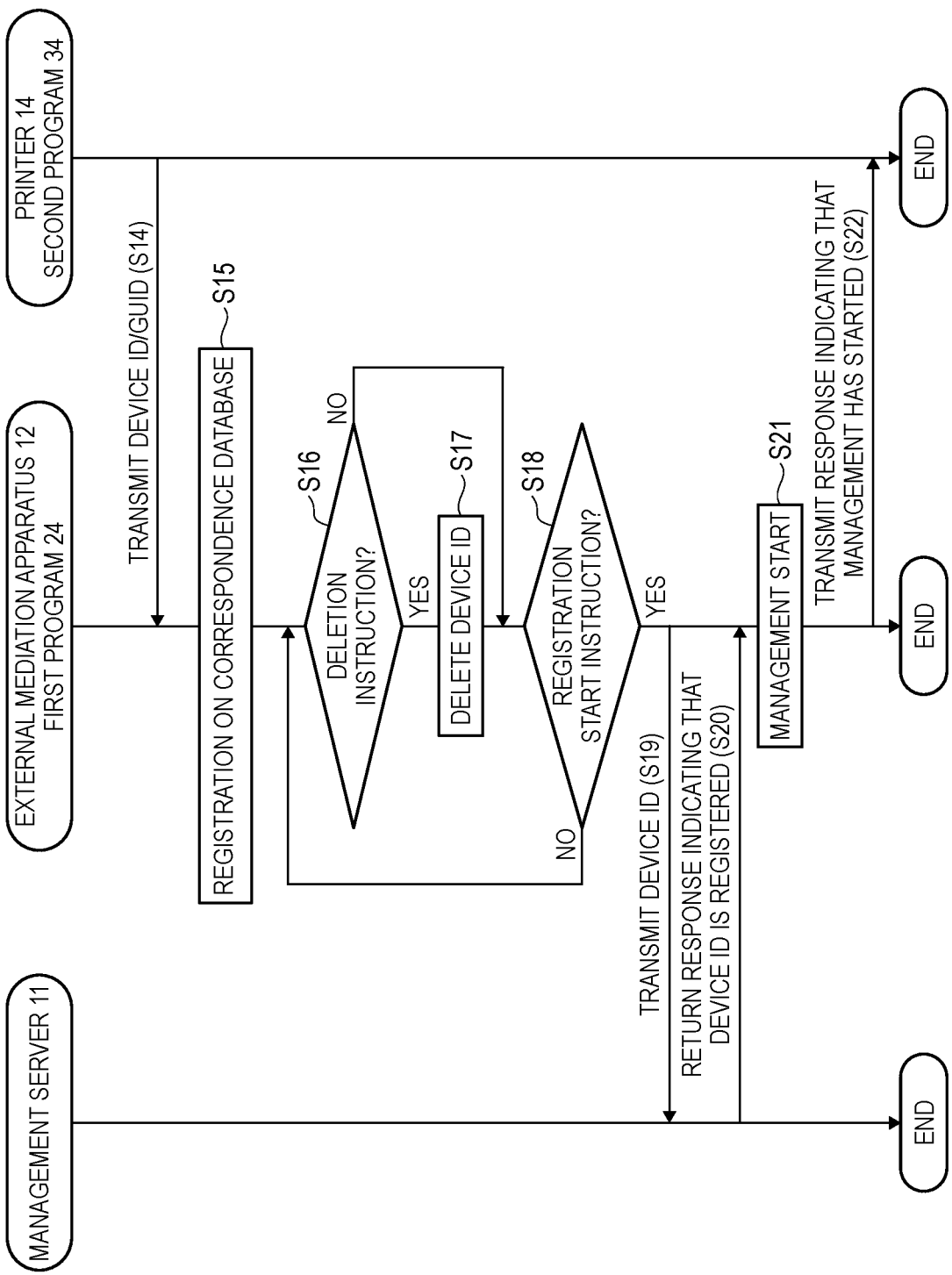
FIG. 3 depicts processing that is executed in a management server, an external mediation apparatus, and a printer when registering the printer on the management server.
Figure 4B:
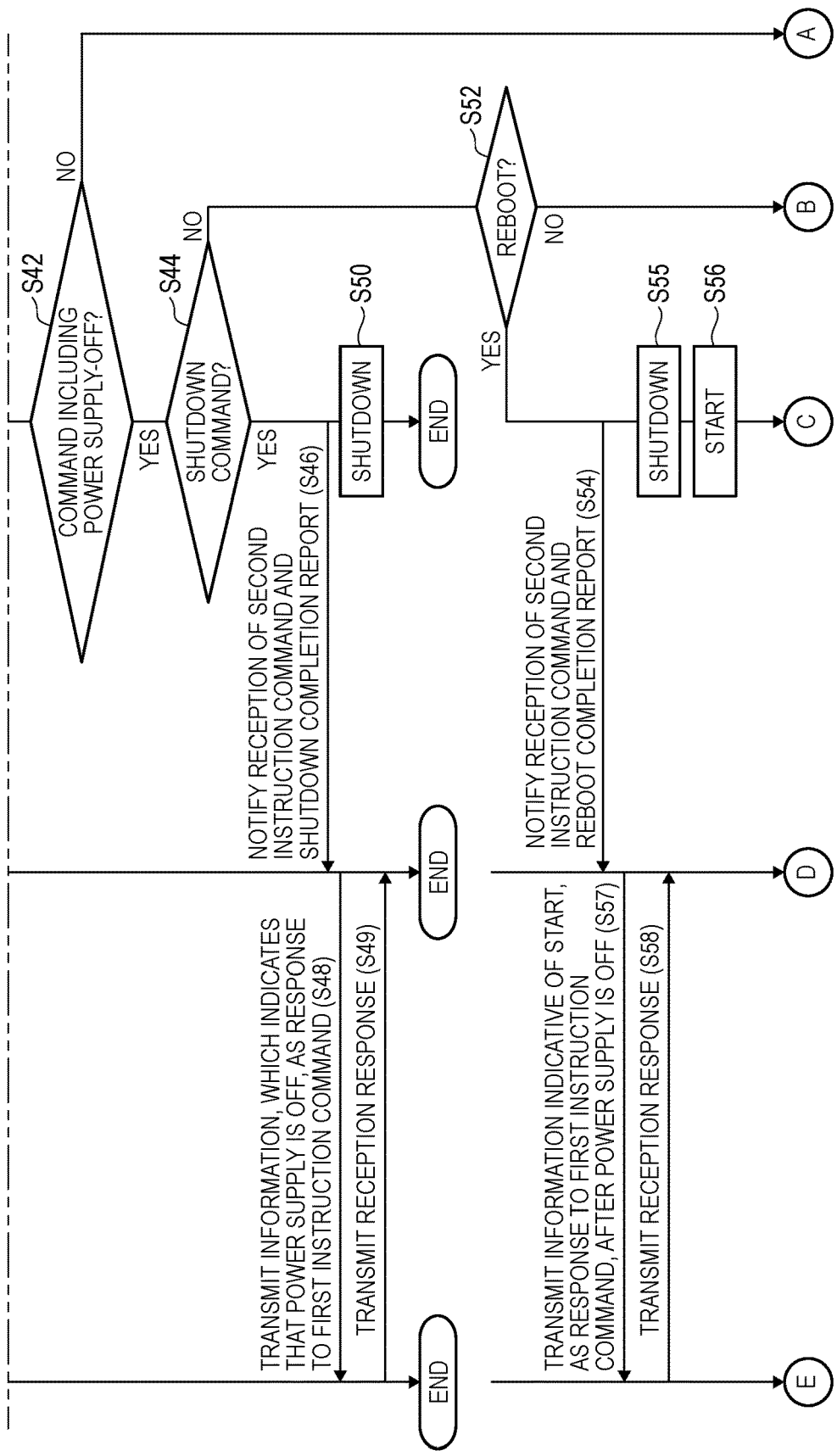
Figure 5A:
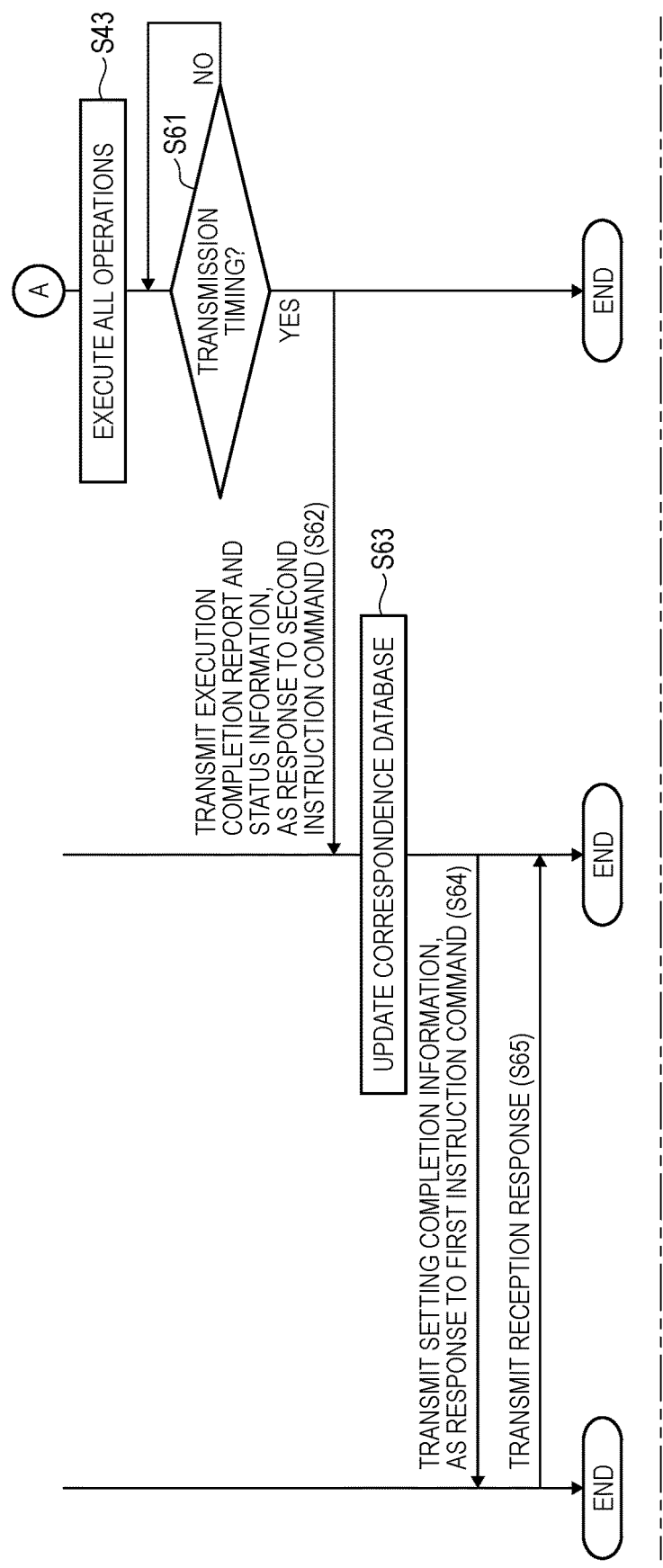
FIGS. 5A and 5B depict processing that is executed in the management server, the external mediation apparatus, and the printer when causing the printer to execute an instruction transmitted from the management server.
Figure 5B:
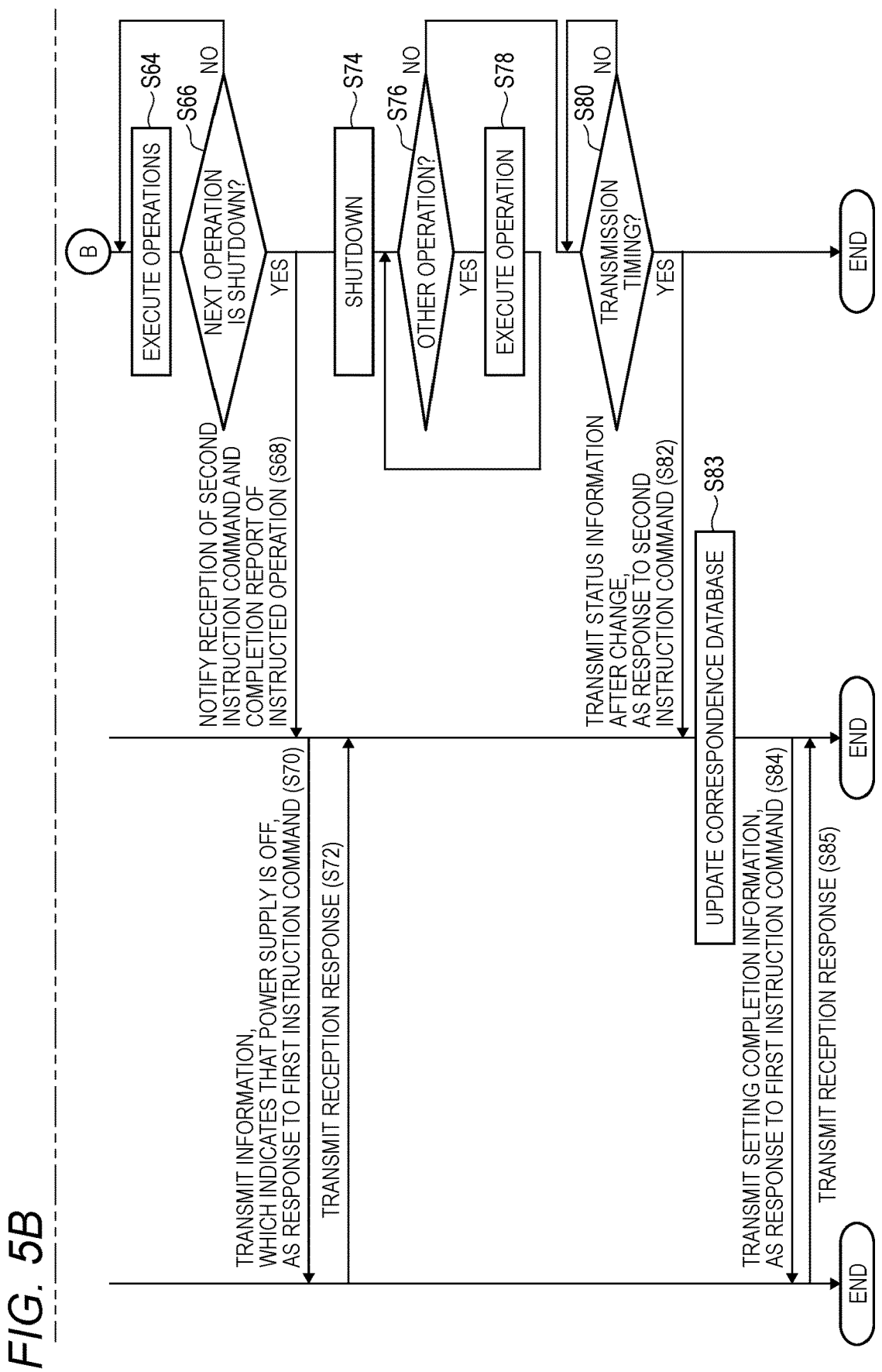

First, processing of registering the device ID of the printer 14 on the correspondence database stored in the memory 22 of the external mediation apparatus 12 and starting management of the management system 10 is described with reference to FIG. 3.

First, in a case where the second program 34 is activated for the first time and initial setting of the second program 34 is executed, or according to a registration instruction input by a person in charge and instructing the printer 14 that is a management target to be registered on the management system 10 or in a case where a registration instruction transmitted from the first program 24 of the external mediation apparatus 12 is received, for example, the second program 34 of the printer 14 transmits an HTTP request, which includes a device ID of the printer and a GUID of the second program stored in the memory 32, to the external mediation apparatus 12 (step S14). Note that, as used herein, the "person in charge" is, for example, a person who manages the printer 14 at each branch and is different from an administrator who operates the external mediation apparatus 12.

The HTTP request transmitted from the second program 34 of the printer 14 and including the device ID and the GUID is received by the external mediation apparatus 12 (step S14). When the device ID and the GUID are received, the first program 24 of the external mediation apparatus 12 determines whether the received device ID is registered already on the correspondence database. When it is determined that the received device ID is not registered, the first program 24 registers a new record on the correspondence database by using the received device ID and (RAD (step S15).

Although not shown in the flowchart, the first program 24 of the external mediation apparatus 12 returns an HTTP response including a response indicating that the device ID is received to the printer 14, as a response to the HTTP received in step S14. Alternatively, the first program 24 of the external mediation apparatus 12 may return an HTTP response including the device ID registered on the correspondence database to the printer 14, as a response to the HTTP received in step S14.

At this time, in the record newly added to the database as described above, "under standby" that is an initial value is stored in the item "state information". In the example of FIG. 2, the record indicative of the printer 14 having the device ID "009" is the newly added record. The printer 14 indicated by the record that is "under standby" is not registered yet on the management server 11. That is, it can be said that the corresponding printer is in a temporarily registered state where it is not set as a management target of the management system 10. Note that, in the record indicative of the printer 14 set as a management target, the "state information" is changed from "under standby" to "under management".

On the other hand, when it is determined that the received device ID is registered already on the correspondence database, the first program 24 of the external mediation apparatus 12 returns a response, which indicates that the received device ID is registered already on the correspondence database, to the printer 14.

Returning to FIG. 3, the first program 24 of the external mediation apparatus 12 determines whether a deletion instruction is input (step S16). The deletion instruction is, for example, an instruction that is input to the external mediation apparatus 12 by the administrator. For example, the first program 24 displays on a display of the external mediation apparatus 12 that a record is generated and is registered on the correspondence database. The administrator who checks the display displays the correspondence database on the display of the external mediation apparatus 12, and determines whether the printer 14 indicated by the device ID that is "under standby" is a printer 14 that is a management target. The administrator inputs the deletion instruction for the device ID of the printer 14 that is not a target to be managed by the management system 10. That is, it is checked whether the device ID registered on the correspondence database is appropriate by the administrator of the external mediation apparatus 12.

When it is determined that the deletion instruction is input (step S16: Yes), the first program 24 of the external mediation apparatus 12 deletes a record for which the deletion instruction is input from the correspondence database (step S17). On the other hand, when it is deletion instruction is not input, the first program 24 of the external mediation apparatus 12 skips over the processing of step S17.

Then, the first program 24 of the external mediation apparatus 12 stands by until a management start instruction to start management of the management system 10 is input (step S18: No). When it is determined that the management start instruction is input (step S18: Yes), the first program 24 transmits a command to the management server 11 (step S19). The command includes the device ID registered on the correspondence database, as ancillary information. Also, the command is a command to request the management server 11 to register the included device ID, as the device ID of the printer 14 that is a management target.

Note that, the first program 24 of the external mediation apparatus 12 may receive an input of an instruction to reject the management start, in step S18. In this case, in step S22, the first program 24 transmits an HTTP response, which indicates that an instruction to reject the management start is input, to the second program 34 of the printer 14. In a case where the HTTP response is received, the second program 34 displays information, which indicates that the instruction to reject the management start is input to the external mediation apparatus 12, on the display of the printer 14, for example. The person in charge can check by the displayed information that the instruction to reject the management start is input to the external mediation apparatus 12.

The command transmitted by the external mediation apparatus 12 is received by the management server 11 (step S19). The management server 11 that receives the command stores the device ID included in the received command in a memory (not shown). That is, the management server 11 registers the device ID included in the received command, as the device ID of the printer 14 that is a management target. Then, the management server 11 returns a response, which indicates that the device ID included in the command is registered, to the external mediation apparatus 12 via the Internet 15 (step S20).

The response returned by the management server 11 is received by the external mediation apparatus 12 (step S20). In a case where the response from the management server 11 is received, the first program 24 of the external mediation apparatus 12 starts management of the management system 10 (step S21). Specifically, the first program 24 changes the item "state information" in the database shown in FIG. 2 from "under standby" to "under management".

Then, the first program 24 of the external mediation apparatus 12 transmits the device ID that is "under management", i.e., the device ID of the printer 14 for which management has started to the printer 14, as an HTTP response to the HTTP request periodically transmitted by the printer 14 (step S22). At this time, the device ID deleted in S17 is not transmitted.

Note that, the first program 24 of the external mediation apparatus 12 may transmit the HTTP response in step S22 to the printer 14, as a response to the HTTP request received in step S14. In this case, the processing of step S16 and step S17 is preferably omitted so that a timeout does not occur.

Although not shown in the flowchart, when the device ID for which management has started is received (step S22), the second program 34 of the printer 14 stores the device ID for which management has started in the memory 42. The second program 34 displays, on the display of the printer 14, for example, that the device ID for which management has started is received, thereby causing the person in charge to recognize the same. The person in charge can display the device ID stored in the memory 42 on the display of the printer 14 and check that management for the printer 14 has started. Note that, the administrator of the external mediation apparatus 12 can check the printer 14 for which management has started by displaying the correspondence database stored in the memory 22 on the display of the external mediation apparatus 12. Also, the administrator of the external mediation apparatus 12 can check the printer 14 for which management has started by displaying data stored in the management server 11 on the display with a browser.

Processing That Is Executed By Instruction From Management Server

Subsequently, a command corresponding to an instruction from the management server 11 is input to the printer 14 having a device ID of a record in which the item "state information" is "under management". That is, the printer 14 is managed by the management server 11. At this time, as described later, the printer 14 is caused to execute desired processing by an instruction from the external mediation apparatus 12 corresponding to an administrator's operation on the management server 11.

At this time, in order to notify the management server 11 that the printer 14 has securely executed the processing, it is necessary to transmit an execution completion report from the printer 14 to the external mediation apparatus 12. However, the processing instructed to the printer 14 from the external mediation apparatus 12 may include a power supply-off operation of the printer. For example, shutdown, reboot (restart), version upgrade of software content and the like may be exemplified. After the power supply-off operation included in these processing is executed, power for transmission is lost, so that the printer 14 cannot perform the execution completion report.

Therefore, in the present embodiment, a management method for solving the above-described defect is provided. In the below, the management method is described in detail with reference to FIGS. 4A, 4B, 5A and 5B. Note that, an instruction to the management server 11 is input to the management server 11 by the administrator with a browser.

First, the management server 11 transmits a first instruction command to the external mediation apparatus 12, via the Internet 15 (step S31). The first instruction command is a command for causing the external mediation apparatus 12 to execute an instruction corresponding to an instruction that is executed by the printer 14. The first instruction command includes a device ID for specifying the printer 14 that is caused to execute the instruction, as ancillary information.

In the present example, the first instruction command is a command for instructing the external mediation apparatus 12 to execute an instruction for causing the printer 14 to perform desired printing, an instruction for changing setting values of the printer 14 with respect to each item of "font", "font size", "concentration" and the like of the setting information (FIG. 2), an instruction to perform version upgrade of software such as the second program 34 of the printer 14, templates for printing, and the like, an instruction to shut down the printer 14, an instruction to restart the printer 14, and the like, for example. Note that, the contents instructed by the first instruction command are not limited to the above examples.

The first program 24 of the external mediation apparatus 12 receives the first instruction command transmitted from the management server 11 (step S31).

In a case where the first instruction command is received (step S31), the first program 24 of the external mediation apparatus 12 transmits a notification, which indicates that the first instruction command is received, to the management server 11 (step S32).

When the first instruction command is received (step S31), the first program 24 of the external mediation apparatus 12 specifies a GUID associated with the device ID included in the first instruction command, from the correspondence database. That is, the first program 24 specifies the second program 34 of the printer 14 to which the instruction is to be transmitted by the GUID. Specifically, the first program 24 specifies a record having the device ID included in the first instruction command, from the correspondence database, and specifies a GUID of the item "GUID" in the specified record, as a corresponding GUID (step S33).

Then, the first program 24 of the external mediation apparatus 12 generates a second instruction command corresponding to an instruction of the first instruction command (step S34). The second instruction command is a command that can be input to the printer 14 and is generated according to a content instructed by the first instruction command. The second instruction command includes the device ID included in the first instruction command, as ancillary information.

Although not shown in FIG. 2, in the data storage area 29 of the memory 22 of the external mediation apparatus 12, a first command list is stored. The first command list shows a correspondence between the first instruction command and the second instruction command. The first program 24 of the external mediation apparatus 12 generates a second instruction command by deciding a second instruction command corresponding to the first instruction command received in step S31 from the first command list, and including the device ID included in the first instruction command in the decided second instruction command, as ancillary information (step S34).

After generating the second instruction command, the first program 24 of the external mediation apparatus 12 stands by until an HTTP request is received from the printer 14.

In the meantime, the second program 34 of the printer 14 determines whether it comes to a transmission timing stored in advance in the memory 32 (step S35). The transmission timing is set as an interval of several seconds to tens of seconds such as an interval of 10 seconds, an interval of 15 seconds, an interval of 20 seconds, and the like, for example.

When it is determined that it comes to the transmission timing (step S35: Yes), the second program 34 of the printer 14 transmits an HTTP request including a GUID thereof to the external mediation apparatus 12 (step S36).

The first program 24 of the external mediation apparatus 12 receives the HTTP request transmitted from the printer 14 (step S36). The first program 24 determines whether the GUID included in the received HTTP request coincides with the GUID decided in step S33 (step S37). That is, the first program 24 determines whether the printer 14 that transmits the HTTP request is the printer 14 to which the second instruction command generated in step S34 is to be transmitted.

When it is determined that the GUID included in the HTTP request received in step S36 does not coincide with the GUID decided in step S33 (step S37: No), the first program 24 of the external mediation apparatus 12 transmits an HTTP response that does not include a second instruction command (step S38). The HTTP response transmitted in step S38 indicates only that the HTTP request transmitted in step S36 is received.

On the other hand, when it is determined that the GUID included in the HTTP request received in step S36 coincides with the GUID decided in step S33 (step S37: Yes), the first program 24 of the external mediation apparatus 12 transmits an HTTP response that includes a second instruction command (step S39). That is, the external mediation apparatus 12 includes the second instruction command in the HTTP response to the HTTP request from the printer 14, and transmits the second instruction command to the printer 14 via the firewall.

The second program 34 of the printer 14 receives the HTTP response transmitted from the external mediation apparatus 12 (step S38, step S39). The second program 34 determines whether a second instruction command is included in the received HTTP response (step S40). When it is determined that the second instruction command is not included in the received HTTP response (step S40: No), the second program 34 returns to step S35 and continues to periodically transmit the HTTP request.

On the other hand, when it is determined that the second instruction command is included in the received HTTP response (step S40: Yes), the second program 34 of the printer 14 determines whether an instruction indicated by the second instruction command is an operation including a shutdown of turning off a power supply (step S42). When it is determined that the instruction indicates an operation including a shutdown (step S42: Yes), the second program 34 of the printer 14 determines whether the instruction indicated by the second instruction command is shutdown itself (step S44). When it is determined that the instruction is shutdown itself (step S44: Yes), the second program 34 transmits an HTTP request, which includes a notification (hereinbelow, referred to as "reception notification") indicative of reception of the second instruction command and a shutdown completion report, to the external mediation apparatus 12 (step S46). That is, in a case where the instruction indicated by the second instruction command is shutdown, the second program 34 transmits a shutdown completion report to the external mediation apparatus 12 before actually performing a shutdown operation. The transmission timing in step S46 is an example of the predetermined timing.

After executing the processing of step S46, the second program 34 of the printer 14 executes an instruction indicated by the second instruction command, i.e., shutdown (step S50).

Then, the first program 24 of the external mediation apparatus 12 transmits a completion report of shutdown corresponding to the instruction indicated by the first instruction command, in other words, a power supply-off of the printer 14, to the management server 11 as a response to the first instruction command received in step S31 (step S48). When the completion report of shutdown is received via the Internet 15 (step S48), the management server 11 transmits a reception response, which indicates that the completion report is received, to the external mediation apparatus 12 (step S49). The first program 24 of the external mediation apparatus 12 receives the reception response transmitted from the management server 11 (step S49), and ends the processing.

On the other hand, when it is determined in step S42 that the second instruction command does not instruct an operation including shutdown, in other words, the second instruction command instructs only an operation that does not include shutdown (step S42: No), the second program 34 of the printer 14 executes all operations included in the instruction indicated by the second instruction command (step S43). For example, cases where the second instruction command is a print instruction for causing the printer 14 to execute desired printing processing, a setting change instruction to change setting values of the printer 14 upon printing with respect to each item of the setting information, a parameter initialization instruction upon printing, and the like may be exemplified. For example, in a case where the second instruction command is an instruction to change the setting of the printer 14 with respect to each item of "font", "font size", "concentration" and the like of the setting information (FIG. 2), the second program 34 changes the setting values of "font", "font size", "concentration" and the like to setting values included in the second instruction command. Note that, the print instruction, the setting change instruction and the parameter initialization instruction are examples of the first instruction.

Then, the second program 34 of the printer 14 stands by until it comes to a transmission timing at which the HTTP request is periodically transmitted (step S61: No). When it is determined that it comes to the transmission timing (step S61: Yes), the second program 34 transmits an HTTP request, which includes an execution completion report and status information after executing the content instructed by the second instruction command in step S43, to the external mediation apparatus 12, as a response to the second instruction command received in step S39 (step S62). Note that, the status information is printing result information, the setting information and the like. Although not shown in the flowchart, after receiving the HTTP request including the execution completion report and the status information (step S62), the first program 24 of the external mediation apparatus 12 transmits information, which indicates that the HTTP request is received, to the printer 14, as an HTTP response to the HTTP request. Note that, the second program 34 may include the execution completion report and the status information in an HTTP request different from the HTTP request that is periodically transmitted, and transmit the same to the external mediation apparatus 12.

The first program 24 of the external mediation apparatus 12 receives the execution completion report and the status information, as a response to the second instruction command (step S62). When the execution completion report and the status information are received, the first program 24 overwrites the values of the setting information and the like in the correspondence database (FIG. 2) with the received status information (step S63).

Then, the first program 24 of the external mediation apparatus 12 generates setting completion information, which includes information indicating that the instruction indicated by the first instruction command is executed by the printer 14 and the status information received in step S62. Then, the first program 24 transmits the generated setting completion information to the management server 11, as a response to the first instruction command received in step S31 (step S64). The setting completion information is, for example, a command that can be input to the management server 11 and has the status information as ancillary information. Note that, the first program 24 of the external mediation apparatus 12 may transmit the execution completion report and status information received in S62 to the management server 11, separately from the setting completion information.

When the setting completion information is received via the Internet 15 (step S64), the management server 11 transmits a reception response, which indicates that the setting completion information is received, to the external mediation apparatus 12 (step S65). The first program 24 of the external mediation apparatus 12 receives the reception response transmitted from the management server 11 (step S65), and ends the processing.

On the other hand, when it is determined in step S44 that the instruction indicated by the second instruction command is not a shutdown instruction (step S44: No), the second program 34 of the printer 14 determines whether the instruction indicated by the second instruction command is a plurality of operations including a shutdown operation firstly (step S52). That is, it is determined whether the instruction indicated by the second instruction command is an instruction to sequentially execute a plurality of operations including a shutdown operation in a predetermined order and to perform the shutdown operation firstly. In this example, as a specific example of the instruction, it is determined whether the instruction is a restart, i.e., reboot instruction to perform a start operation after performing a shutdown operation firstly. Note that, the reboot instruction is an example of the second instruction.

When it is determined that the instruction is the reboot instruction (step S52: Yes), the second program 34 transmits an HTTP request including a reception notification, which indicates that the second instruction command is received, and a reboot completion report to the external mediation apparatus 12 (step S54). That is, in a case where the instruction indicated by the second instruction command is the reboot instruction, the second program 34 transmits the reboot completion report to the external mediation apparatus 12 before actually performing a reboot operation. The transmission timing in step S54 is an example of the predetermined timing. After executing the processing of step S54, the second program 34 of the printer 14 executes an instruction indicated by the second instruction command, i.e., a shutdown operation and a start operation thereafter (step S55, step S56). Note that, after the start operation, the processing returns to the first sequence, i.e., step S31 and step S35 of the flowchart shown in FIG. 4A, and the same processing is repeated.

Then, the first program 24 of the external mediation apparatus 12 transmits a reboot completion report corresponding to the instruction indicated by the first instruction command, in other words, information indicating that a start operation is performed after the power supply of the printer 14 becomes off, to the management server 11 as a response to the first instruction command received in step S31 (step S57). When the reboot completion report is received via the Internet 15 (step S57), the management server 11 transmits a reception response, which indicates that the completion report is received, to the external mediation apparatus 12 (step S58). The first program 24 of the external mediation apparatus 12 receives the reception response transmitted from the management server 11 (step S58), and ends the processing.

On the other hand, when it is determined in step S52 that the instruction indicated by the second instruction command is not a plurality of operations including a shutdown operation firstly, in other words, is a plurality of operations including a shutdown operation secondly or thereafter (step S52: No), the second program 34 of the printer 14 executes operations in order from the beginning, which are included in the instruction indicated by the second instruction command (step S64). According to the above example, in a case where the instruction indicated by the second instruction command is an instruction to perform the version upgrade of the software content, for example, it is determined that the instruction is not the reboot instruction and a determination result of step S52 is thus negative. This is because in the case of the version upgrade, a download operation of the software content is first performed, a shutdown operation is then performed and a start operation is thereafter performed. Note that, the instruction to perform the version upgrade of the software content is an example of the third instruction. When instruction indicated by the second instruction command is an instruction to perform the version upgrade, the second program 34 of the printer 14 first executes a download operation (step S64). That is, the second program 34 of the printer 14 transmits an HTTP request, which includes a request for transmission of a file of the software content, to the external mediation apparatus 12. The first program 24 of the external mediation apparatus 12 that receives the HTTP request transmits an HTTP response including a file to the printer 14, in response to a command included in the HTTP request. The second program 34 of the printer 14 receives the file included in the HTTP response, and updates the second program by a program included in the file. Note that, the file may also be transmitted with being included in the second instruction command. In this case, the request for transmission of a file is not transmitted from the second program 34 to the first program 24.

Then, since an operation that is executed after the download operation is the shutdown operation (step S66: Yes), as described above, the second program 34 of the printer 14 transmits an HTTP request, which includes the reception notification indicating that the second instruction command is received and a completion report of the version upgrade of the software content, to the external mediation apparatus 12 (step S68). That is, when the instruction indicated by the second instruction command is the version upgrade of the software content, the second program 34 transmits a completion report of the version upgrade to the external mediation apparatus 12 before the version upgrade is actually completed. The transmission timing in step S68 is an example of the predetermined timing. Note that, instead of the completion report of the version upgrade, the second program 34 of the printer 14 may transmit a completion report of an operation immediately before the shutdown, i.e., the completion report of download to the external mediation apparatus 12.

After executing the processing of step S68, the second program 34 of the printer 14 executes a shutdown operation (step S74).

Then, the first program 24 of the external mediation apparatus 12 transmits a completion report of the version upgrade of the software content corresponding to the instruction indicated by the first instruction command, in other words, information indicating that the power supply of the printer 14 is once off to the management server 11, as a response to the first instruction command received in step S31 (step S70). When the completion report of the version upgrade of the software content is received via the Internet 15 (step S70), the management server 11 transmits a reception response, which indicates that the completion report is received, to the external mediation apparatus 12 (step S72). The first program 24 of the external mediation apparatus 12 receives the reception response transmitted from the management server 11 (step S72), and ends the processing.

Then, the second program 34 of the printer 14 determines whether there is an operation that is left unexecuted after executing the shutdown operation in step S74 (step S76), and sequentially executes all the remaining operations until there is no operation that is left unexecuted (step S78). Thereby, for example, in a case where the instruction indicated by the second instruction command is the instruction to perform the version upgrade, the start operation is performed after the shutdown operation.

When it is determined that there is no operation that is left unexecuted (step S76: No), the second program 34 of the printer 14 stands by until it comes to the transmission timing at which an HTTP request is periodically transmitted (step S80: No). When it is determined that it comes to the transmission timing (step S80: Yes), the second program 34 transmits an HTTP request, which includes status information after the content instructed by the second instruction command is executed in step S64, step S74 and step S78, to the external mediation apparatus 12, as a response to the second instruction command received in step S39 (step S82). Although not shown in the flowchart, after receiving the HTTP request including the status information (step S82), the first program 24 of the external mediation apparatus 12 transmits information, which indicates that the HTTP request is received, to the printer 14, as an HTTP response to the HTTP request.

The first program 24 of the external mediation apparatus 12 receives the status information after change, as a response to the second instruction command (step S82). When the status information after change is received, the first program 24 overwrites the values of the setting information and the like in the correspondence database with the received status information (step S83).

Then, the first program 24 of the external mediation apparatus 12 generates setting completion information, which includes the status information received in step S82. Then, the first program 24 transmits the generated setting completion information to the management server 11, as a response to the first instruction command received in step S31 (step S84).

When the setting completion information is received via the Internet 15 (step S84), the management server 11 transmits a reception response, which indicates that the setting completion information is received, to the external mediation apparatus 12 (step S85). The first program 24 of the external mediation apparatus 12 receives the reception response transmitted from the management server 11 (step S85), and ends the processing.

In each procedure shown in FIGS. 4A, 4B, 5A and 5B, the processing that is executed in step S39 is an example of the receiving of the processing execution instruction. Also, the processing that is executed in step S42 is an example of determining whether the received processing execution instruction is a first instruction, step S44 is an example of determining whether the received processing execution instruction is a second instruction, and step S52 is an example of determining whether the received processing execution instruction is a third instruction. Also, the processing that is executed in step S46, step S54, step S62 and step S82 is an example of the transmitting of an execution completion report.

Effects of Embodiment

As described above, in the present embodiment, after receiving the second instruction command from the external mediation apparatus 12 in step S39, the second program 34 of the printer 14 executes the determinations of step S42, step S44 and step S52. That is, it is determined whether the instruction indicated by the received second instruction command is an instruction that does not involve the power supply-off operation. When it is determined that the instruction is an instruction that does not involve the power supply-off operation (step S42: No), the execution completion report is transmitted to the external mediation apparatus 12 at the time when the execution of the instructed processing is all completed (step S62). On the other hand, when it is determined that the instruction is an instruction that involves the power supply-off operation (step S42: Yes), the execution completion report is transmitted to the external mediation apparatus 12 at a timing earlier than the execution completion of the instructed processing (step S46, step S54, step S68). Thereby, it is possible to transmit the execution completion report to the external mediation apparatus 12 before the power supply-off operation is executed and thus the execution completion report becomes incapable of being transmitted.

Also, in the present embodiment, in particular, the second program 34 of the printer 14 transmits the execution completion report before the processing that is executed according to the instruction that involves the power supply-off operation starts (step S46, step S54), and executes the instructed processing after transmitting the execution completion report (step S50, step S55 and step S56). Thereby, after transmitting the execution completion report corresponding to the instruction, it is possible to securely execute the instructed processing.

Also, in the present embodiment, in particular, the instruction that does not involve the power supply-off operation includes at least one of an instruction for causing the print engine 51 to execute printing processing, an instruction to change a setting upon printing by the print engine 51, and a parameter initialization instruction upon printing by the print engine 51. Thereby, in cases of the printing processing, the setting change processing, the parameter initialization processing and the like that do not involve the power supply-off operation, the completion thereof may be reported to the external mediation apparatus 12 at a timing at which the execution of the processing thereof is completed (step S62).

Also, even in a case where the processing instructed from the external mediation apparatus 12 includes the power supply-off operation and other operations, in a case where the processing is processing where the power supply-off operation is executed firstly, power for transmission is lost after the processing starts. Therefore, in the present embodiment, in particular, the execution completion report is transmitted before execution of the processing starts (step S54). Thereby, it is possible to securely transmit the report to the external mediation apparatus 12 while the power is secured. That is, for example, upon reboot of the printer 14 in which the power supply-off operation is executed firstly, it is possible to transmit the report to the external mediation apparatus 12 while the power supply is still in the on state (step S54).

Also, in a case where the processing instructed from the external mediation apparatus 12 is processing where the power supply-off operation and other operations are included and the power supply-off operation is executed in an order other than first, even after the processing starts, the power for transmission is secured if it is before the power supply-off operation is executed. Therefore, in the present embodiment, in particular, the execution completion report is transmitted at a timing at which execution of another operation, which is executed immediately before the execution of the power supply-off operation, is completed after the execution of the processing has started (step S68). Thereby, it is possible to transmit the report to the external mediation apparatus 12 while the power supply is secured. Also, it is possible to transmit the execution completion report in a form that reflects a new operating situation as much as possible immediately before the power supply becomes off. That is, for example, when executing processing such as version upgrade processing of software in a flow of a download operation (step S64), an install operation (step S64), a power supply-off operation (step S74) and a restart operation (step S78), it is possible to transmit the execution completion report in a form that reflects a new operating situation immediately before the power supply becomes off (step S68).

In the embodiment, the printer 14 transmits the HTTP request and the external mediation apparatus 12 returns the HTTP response, so that the second instruction command is transmitted from the external mediation apparatus 12 to the printer 14 via the firewall. However, other communication protocols may also be used inasmuch as the second instruction command can be transmitted from the external mediation apparatus 12 to the printer 14 via the firewall. For example, a communication protocol conforming to XMP-PoverBOSH may be used between the external mediation apparatus 12 and the printer 14. The second instruction command can be transmitted from the external mediation apparatus 12 to the printer 14 via the firewall by communication in a session established as a session start request of XMPPoverBOSH is transmitted from the external mediation apparatus 12 to the printer 14 and the external mediation apparatus 12 returns a session start response.

Also, in the embodiment, the printer 14 that is a printing apparatus has been exemplified as the electronic device that is a management target by the management server 11. However, the present disclosure is not limited thereto. That is, the present disclosure can also be applied to a digital camera, a personal computer, a measurement device, a clock, a barcode reader, a scanner, a sewing machine, other information devices/communication devices/control devices/diverse machines and the like inasmuch as they are electronic devices capable of performing communication with the external mediation apparatus 12. Also in this case, the similar effects can be achieved.

In the embodiment, the sequences shown in FIGS. 4A, 4B, 5A and 5B are not intended to limit the present disclosure to the procedures shown in the flowcharts. That is, a procedure may be added, deleted, changed and the like without departing from the gist of the disclosure and the technical spirit.

In addition to the above, the embodiment and each modified embodiment be used with being combined as appropriate.

Also, although not exemplified in detail, the present disclosure can be implemented with being diversely modified without departing from the spirit thereof.

What is claimed is:
1. A printing apparatus comprising:
a printing engine configured to perform printing on a printing medium; and
a controller,
wherein the printing apparatus is configured to perform communication with an external mediation apparatus configured to perform communication with a management server via the Internet, and wherein the controller is configured to:
receive a processing execution instruction for executing a predetermined processing from the external mediation apparatus;
determine whether the received processing execution instruction is a first instruction that does not involve a power supply-off operation; and
transmit an execution completion report to the external mediation apparatus such that:
in a case where the determining determines that the processing execution instruction is the first instruction, the execution completion report is transmitted to the external mediation apparatus at a time when execution of processing instructed by the first instruction is completed; and
in a case where the determining does not determine that the processing execution instruction is the first instruction, the execution completion report is transmitted to the external mediation apparatus at a predetermined timing which is before execution of processing instructed by the processing execution instruction is completed.

2. The printing apparatus according to claim 1, wherein the predetermined timing at which the controller transmits the execution completion report is before the execution of the processing instructed by the processing execution instruction starts, and
wherein the controller is further configured to:
execute the processing instructed by the processing execution instruction after transmitting the execution completion report.

3. The printing apparatus according to claim 1, wherein the first instruction is any one of an execution instruction of printing processing by the printing engine, a setting change instruction upon printing by the printing engine, and a parameter initialization instruction upon printing by the printing engine.

4. The printing apparatus according to claim 1, wherein the controller is further configured to:
determine whether the received processing execution instruction is a second instruction to sequentially execute a plurality of operations including a power supply-off operation in a predetermined order and to perform the power supply-off operation firstly,
wherein in a case where the determining determines that the processing execution instruction is the second instruction, the predetermined timing at which the controller transmits the execution completion report is before execution of processing instructed by the second instruction starts, and
wherein the controller is further configured to:
execute the processing instructed by the second instruction after transmitting the execution completion report.

5. The printing apparatus according to claim 4, wherein the second instruction is a restart instruction of the printing apparatus.

6. The printing apparatus according to claim 1, wherein the controller is further configured to:
determine whether the received processing execution instruction is a third instruction to sequentially execute a plurality of operations including a power supply-off operation in a predetermined order and to perform the power supply-off operation in an order other than first,
wherein in a case where the determining determines that the processing execution instruction is the third instruction, the predetermined timing at which the controller transmits the execution completion report is before the execution of the power supply-off operation and after execution of an operation that is executed immediately before the power supply-off operation in the predetermined order, and
wherein the controller is further configured to:
execute the power supply-off operation after transmitting the execution completion report.

7. The printing apparatus according to claim 6, wherein the third instruction is an instruction of processing including download of a software content that is used for the printing apparatus.

8. A non-transitory computer-readable storage medium storing a computer program readable by a computer of an electronic device configured to perform communication with an external mediation apparatus configured to perform communication with a management server via the Internet, the computer program, when executed by the computer, causing the electronic device to perform:
receiving a processing execution instruction for executing a predetermined processing from the external mediation apparatus;
determining whether the received processing execution instruction is a first instruction that does not involve a power supply-off operation; and
transmitting an execution completion report to the external mediation apparatus such that:
in a case where the determining determines that the processing execution instruction is the first instruction, the execution completion report is transmitted to the external mediation apparatus at a time when execution of processing instructed by the first instruction is completed; and
in a case where the determining does not determine that the processing execution instruction is the first instruction, the execution completion report is transmitted to the external mediation apparatus at a predetermined timing which is before execution of processing instructed by the processing execution instruction is completed.

* * * * *